Jan. 27, 1970 J. L. GRAUMANN ET AL 3,491,821

METHOD AND APPARATUS FOR DRYING UREA SOLUTIONS

Filed Feb. 3, 1969

INVENTORS
JOHN L. GRAUMANN,
ALFRED N. MAJOR
BY
Peter L. Costas
ATTORNEY

United States Patent Office 3,491,821
Patented Jan. 27, 1970

3,491,821
METHOD AND APPARATUS FOR DRYING UREA SOLUTIONS

John L. Graumann and Alfred N. Major, West Hartford, Conn., assignors to The Whitlock Manufacturing Company, West Hartford, Conn., a corporation of Connecticut Continuation-in-part of application Ser. No. 610,572, Jan. 20, 1967. This application Feb. 3, 1969, Ser. No. 800,809
Int. Cl. B01d *1/22*
U.S. Cl. 159—13 7 Claims

ABSTRACT OF THE DISCLOSURE

There is disclosed a method and apparatus for drying urea solutions which initially contain about 5 to 35 percent of water to a water content of less than about 1 percent, and preferably less than 0.5 percent, by weight. The urea solution is distributed on the surface of tubes as a falling film which is heated and discharged into a packed section. In both the tubes and packed section, the urea solution is exposed to a counter current flow of heated inert gas. The tubes directly discharge the urea solution onto and over the surface of the packed section to achieve distribution thereof.

Reference to related application

The present application is a continuation-in-part of our copending application, Ser. No. 610,572, filed Jan. 20, 1967, now abandoned and bearing the same title.

Background of the invention

The methods concurrently employed to synthesize urea generally result in a product containing about 5 to 35 percent of water, and more commonly from about 20 to 30 percent of water. Since the water dilutes the desired product and adds to the weight and bulk thereof, numerous methods have been suggested for effecting the removal of water from the urea solutions. The most prevalent techniques generally employ some form of evaporation to remove at least a portion of the water. However, since exposure to elevated temperatures tends to produce decomposition of the urea, it has not been considered feasible to dry such solutions to substantial dryness at atmospheric pressure and in the absence of a protective atmosphere tending to retard such decomposition, such as ammonia.

Methods have been proposed which involve evaporation of the urea solutions to less than 5 percent by weight of water, followed by formation of the solution into prills which are then dried in a subsequent operation. Such a process is undesirable not only because it adds an additional step to the process, but also because the heat of the subsequent drying step tends to produce decomposition of the urea into ammonia and biuret. Use of a partial vacuum during evaporation creates problems in operation and maintenance and adds inconvenience and expense to the process. In addition, low pressure conditions tend to promote premature crystallization of the product.

Illustrative of the various techniques which have been proposed are the following United States patents: Michelitsch, 2,916,516, Dec. 8, 1959; Guyer et al., 2,933,526; Apr. 19, 1960; Cook, 3,147,174, Sept. 1, 1964; Templeton et al., 3,223,145, Dec. 14, 1965.

It is an object of the present invention to provide a simple and highly effective method for drying urea solutions in a single pass from an initial water content of about 5 to 35 percent by weight to a water content of less than 1 percent without substantial decomposition of the urea.

It is also an object to provide such a method which is conducted at atmospheric pressure conveniently and economically and which avoids the formation of solid material which would tend to foul the apparatus.

It is a further object to provide relatively simple and economical apparatus which can be employed at atmospheric pressure to effect the desirable reduction in water content of urea solutions while minimizing decomposition of the urea.

Summary of the invention

It has now been found that the foregoing objects, and related objects and advantages, can be readily attained in a process for drying urea solutions wherein a substantially uniform film of a urea solution containing about 5.0 to 35.0 percent by weight thereof of water is formed on the interior surface of at least one elongated vertically disposed tube. A substantial portion of the exterior surface of the portion of the tube through which the urea solution passes is contacted with a heating medium to heat the urea solution to a temperature of about 260° to 310° Fahrenheit and to reduce the water content thereof to about 1.0 to 2.5 percent by weight. The urea solution is then passed from the tube downwardly through a packed section. At the same time, a stream of inert gas heated to a temperature of about 250° to 350° Fahrenheit and having a mass velocity of from about 0.3 to 0.9 pound per second per square foot of tube cross-section is passed upwardly through the packed section and then through the tube in counter-current contact with the urea solution both in the packed section and in the tube. The urea is thereafter recovered from the bottom of the packed section at a temperature of about 260° to 295° Fahrenheit, with a water content of less than about 1.0 percent by weight. The process is carried out at substantially atmospheric pressure, and during the processes the urea solution resides in the heated portion of the tube and in the packed section for a total time not in excess of about 35 seconds. Generally, proper use of the process will ensure that the biuret content of the urea is increased less than about 0.5 percent by weight thereof.

The preferred apparatus contains a plurality of tubes and the urea solution is discharged directly from the tubes onto and over the upper surface of the packed section to effect distribution thereof, the tubes being generally uniformly distributed above substantially the entire surface of the packed section.

Description of the preferred embodiments

Figure 1:
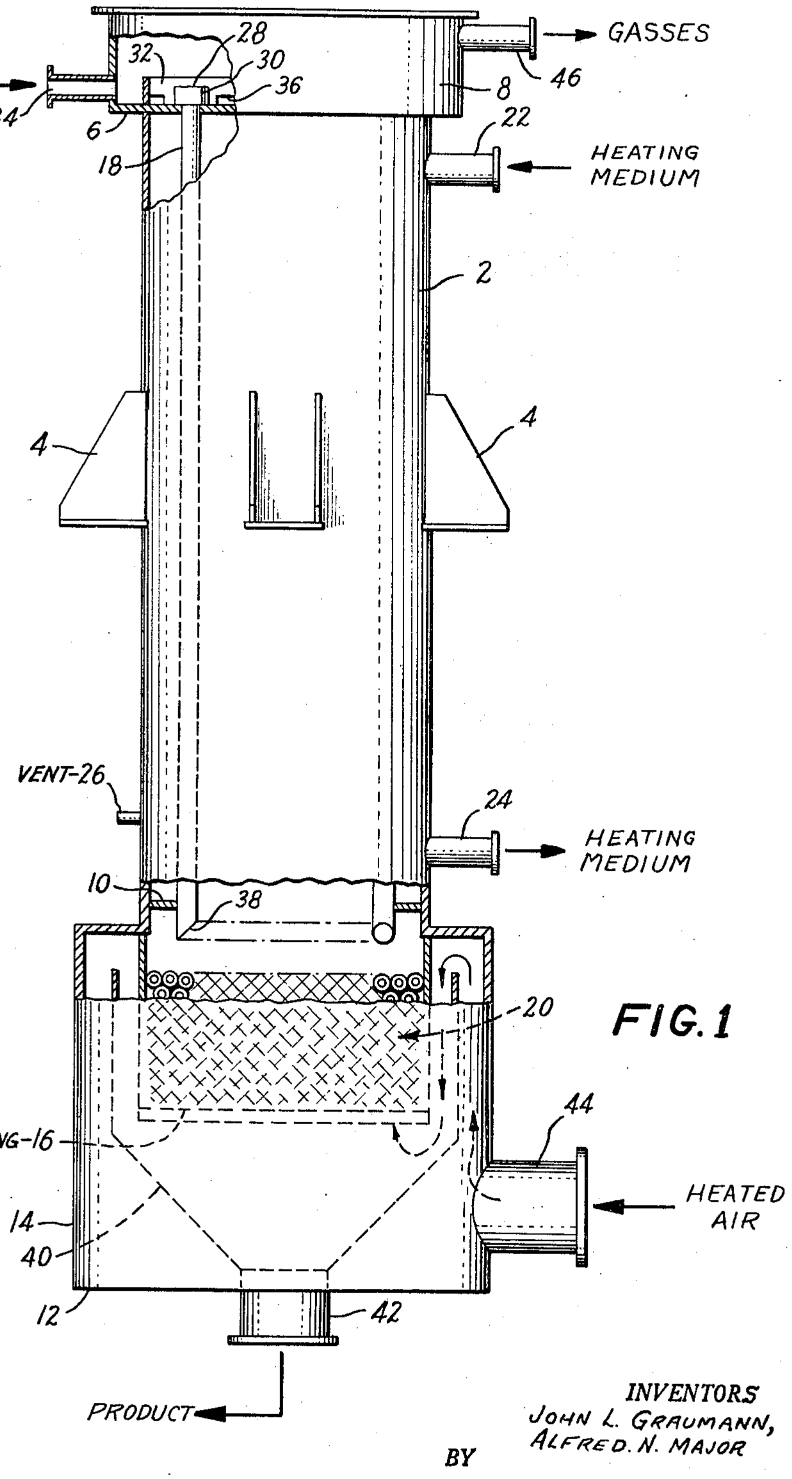
FIGURE 1 is an elevational view in partial section of a drying apparatus embodying the present invention.
Figure 2:
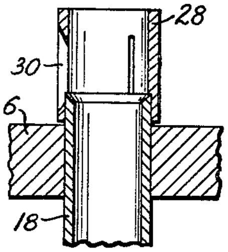
FIGURE 2 is a fragmentary sectional view of a tube and ferrule.

Referring to the attached drawing, therein illustrated is a drying apparatus constructed in accordance with the present invention and utilizing the general construction for the falling film portion disclosed and claimed in our prior United States Patent No. 3,087,533 granted Apr. 30, 1963. The shell 2 is provided with several brackets 4 by which the apparatus is mounted in vertical position. Upper tube sheet 6 partitions the body of the shell from the distributing chamber 8, and lower tube sheet 10 similarly partitions the body of the shell from the plenum chamber 14, which is closed by a bottom wall 12. A foraminous support or grating 16 supports a packed section 20 between the lower tube sheet 10 and the bottom wall 12.

A plurality of tubes 18 is supported in the tube sheets 6 and 10 and preferably extends therethrough for a purpose to be hereinafter more fully described. The tubes 18 are most desirably secured in the tube sheets by expanding them into the metal of the tube sheets. Steam or other heat exchange fluid is fed into the inlet 22, passes downwardly through the shell 2 in contact with the exterior surfaces of tubes 18, and is discharged through the outlet 24. The shell 2 is also provided with an air vent 26 for discharging non-condensibles during start-up and during operation.

The upper ends of the tubes 18 extend through the upper tube sheet 6 into the distributing chamber 8 wherein they are each provided with a tubular distributing ferrule 28 which seats around or over the outer periphery of the tube. The ferrule 28 is preferably provided with a plurality of axially extending slots 30 which are secantly disposed with respect to the axis of the ferrule. The slots 30 are spaced axially from the ends of the ferrule and define openings of substantially fixed dimensions. After seating the tubes 18 in the tube sheet 6, the projecting ends of the tubes are machined so that their upper ends are in a substantially uniform plane, and the ferrules 28 also are preferably machined so as to provide a snug-fitting seat around the end of the tubes 18. Since the ends of the tubes 18 are disposed upwardly of the lower end of the slots 30, the ends of the tubes 18 thus function as the effective lower end of the slots 30 to make them uniform throughout the several ferrules 28. The inside surfaces of the ends of the tubes 18 are beveled to ensure smooth flow of the film of liquid composition from the ferrules 28 onto the wall of the tubes 18.

The distributing chamber 8 is provided with a weir 32 spaced from the outer wall which surrounds the tubes and separates them from the liquid composition supply inlet 34. A plurality of apertures 36 spaced about the bottom of the weir 32 introduces the liquid composition into the tube portion of the chamber 8 below the surface level of the liquid composition to minimize turbulence, and the liquid level in the distributing chamber 8 is maintained below the tops of the slots 30 in the ferrules 28. In this manner, the liquid level will determine the upper end of the flow-through portion of the slots 30. Because the liquid level is substantially uniform in this baffled distribution chamber 8 and the operative lower end of the slots 30 is determined by the uniformly machined tube ends, a predetermined and substantially uniform amount of liquid composition will be introduced into each tube 18. Although the distribution chamber outer wall may be a continuation of the body of the shell, it is preferably a separate element for maximum utilization of the shell body and ease of manufacture, as illustrated in the drawing. A more detailed description of the ferrules 28 and distribution chamber 8 may be found in our aforementioned United States Patent No. 3,087,533.

Referring next to the lower end of the apparatus, the plenum chamber 14 is also preferrably separately fabricated from the shell body. Illustrated is a preferred embodiment of the apparatus wherein the packed section 20 is disposed within the plenum chamber 14, although the apparatus may be constructed so that the plenum chamber 14 is entirely below the packed section 20. As is shown in the figure, the tubes 18 project beyond the lower tube sheet 10 and terminate short of, but feed directly onto substantially the entire area of the surface of the packing in the packed section 20. The tubes 18 are provided with mitred end portions 38 to consolidate the discharge of the solution from each tube. An upwardly opening funnel-shaped member 40 of greater diameter than the packed section 20 and lesser diameter than the plenum chamber 14 collects the discharged liquid from the packed section 20 and channels it outwardly through the outlet 42 which communicates with the headbox of a processing unit, such as the spray equipment of a prilling tower (not shown).

Air or other inert gas of a predetermined temperature and velocity is introduced into the plenum chamber 14 through the inlet 44 and flows upwardly about the outside surface of the funnel-shaped member 40 and thence through the annular space between the funnel-shaped member 40 and the packed section 20. The preheated air or inert gas heats the funnel-shaped member 40 during its flow and provides a jacketed and heated discharge zone and packed section to prevent premature or excessive cooling of the product. Additional jacketing on these portions of the apparatus may also be provided.

In the operation of the apparatus, heat-exchange fluid, conveniently steam or a chlorinated liquid such as Monsanto Company's polychlorinated polyphenyls, bearing the trademark "Aroclor," is heated and is supplied to the apparatus through the inlet 22, wherein it passes through the body of the shell in contact with the exterior surface of the tubes 18 and is then discharged through the outlet 24. The liquid composition to be dried is supplied to the outer portion of the distribution chamber 8 through the inlet 34, flows under the weir 32, and thence into the secantal slots 30 of the ferrules 28, which impart a circular motion to the entering film to ensure thorough distribution over the entire periphery of the interior surface. The film then descends gravitationally onto the beveled ends of the tubes 18 and continues its descent along the interior wall of the tubes until it falls off the mitred bottom ends 38 of the tubes 18 onto the packed section 20. After passing through the packed section 20, the material falls onto the funnel-shaped member 40 and is discharged through the outlet 42 to auxiliary apparatus such as a packaging unit or a prilling tower to form the substantially dry urea into prills. Simultaneously, air or other gas inert to the composition is supplied to plenum chamber 14 through inlet 44 at a temperature on the order of that ultimately desired in the liquid composition and at a velocity below that at which substantial entrainment will occur. The gas passes in counter-current contact with the downwardly passing material by entering the bottom of the packed section 20, passing upwardly through the packing, thereafter entering the bottom of the tubes 18, and continuing upwardly through the tubes 18 into the chamber 8 and finally out the discharge outlet 48 along with water vapor which has been removed from the urea.

It will be readily apparent that the described arrangement of the machined tube ends and slotted ferrules, together, with control of the liquid level in the distribution chamber, provides a distribution system which substantially ensures entry of uniform and predetermined amounts of fluid composition into each ferrule and tube throughout the chamber. The secantal slots have proven especially significant in obtaining uniform distribution of the entering composition about the entire periphery of the ferrules and tubes. It will also be clear that, while the use of the described arrangement constitutes a preferred embodiment of the apparatus of the present invention, other distributing means which will ensure entry of substantially uniform and predetermined amounts of fluid composition into each tube 18 and provide substantially uniform distributing of the entering composition about the periphery of the tubes 18, could also be employed.

Positioning the tubes 18 in a generally uniform pattern throughout substantially the entire cross-section of the casing, and directly over substantially the entire surface-area of the packed section 20, provides entirely satisfactory, distribution of material to the packed section 20. If a wiped-film type of evaporator were used, rather than the falling-film type of the present invention, the centrifugal forces on the material exiting from the tubes, urging the material toward the evaporator wall, necessitate the use of auxiliary means, such as a redistributing device, to properly distribute the material to the packed section. This not only requires an increased capital investment, but also increases residence times in the apparatus at elevated temperature conditions, which is generally undesirable because it lengthens the time required for a process cycle and would tend to have a deleterious effect on the product.

In constructing the apparatus of the present invention, those surfaces exposed to the chemical composition should be corrosion-resistant, such as stainless steel. Thus in the illustrated apparatus, it is preferable to fabricate the tubes. tube sheets, weir, ferrules and funnel-shaped member of stainless steel, and at least the inside surfaces of the distribution chamber should be stainless steel. Other parts can advantageously be fabricated of carbon steel.

The urea solution is fed into the distribution chamber at a rate dependent upon the water content of the solution and upon the tube area provided, and at a temperature which is primarily dependent upon the synthesis conditions, since the evaporator is desirably coupled with a reactor for making urea. Thus, suitable feed temperatures are generally about 120° to 260° Fahrenheit and preferably about 230° to 250° Fahrenheit. When using solutions of about 120° to 200° Fahrenheit in temperature, it is desirable to supply additional heat to the packed section of the apparatus and to use relatively long tubes. More elevated temperatures should generally be avoided to reduce the tendency for decomposition of the urea to biuret and ammonia. To obtain the most desirable type of product, the initial biuret content of the feed stream should not be in excess of about 0.4 percent by weight of the urea.

The heating of the film is conveniently effected by use of a heat exchange thermal fluid such as chlorinated hydrocarbons heated to about 265° to 315° Fahrenheit or by the use of steam at about 25 to 69 p.s.i.g. to provide the same temperatures. Generally the film will be heated to a temperature about 5 to 20° Fahrenheit below that of the heat-exchange medium.

The inert gas, most conveniently air, is heated to an elevated temperature of about 250 to 350° Fahrenheit, and preferably 290 to 330° Fahrenheit, to achieve the desired degree of drying and to avoid sensible cooling in the packed section. The temperature of the air must not be so high as to produce excessive amounts of biuret. On the other hand, it must be high enough so that crystallization of the urea on the surfaces of the apparatus will be avoided. It should be noted that at atmospheric pressure, urea containing 1 percent of biuret has a crystallization temperature of about 260° Fahrenheit; thus, that is the lowest temperature to which the urea in the apparatus should be allowed to fall. Although the incoming inert gas stream may have a dew point as high as about 85° Fahrenheit, gases having dew points of 65° Fahrenheit and lower are most desirable. Since the degree of dryness which is ultimately attained in the product is closely related to the dryness of the inert gas which is employed, gases having dew points as low as practicable should be used. The rate at which the gas is introduced generally should be about 0.3 to 0.9 pound per second per square foot of tube cross section. If a mass velocity lower than 0.3 is employed, usually the mass transfer will be insufficient. Mass velocities higher than about 0.9 tend to result in loss of product due to entrainment thereof in the gas stream.

In the production of urea, it is important that the residence time of the solution in the apparatus not be too long, since lengthy exposure of the urea to elevated temperature conditions has a great tendency to produce biuret. Thus, the residence time for the urea solution in the heated portion of the tubes and in the packed section should not total more than about 35 seconds. Generally, it is preferred to limit the residence time to 20 seconds or less, but it should of course be appreciated that if the rate of throughput is too great, the evaporation of water will be inadequate.

The number of tubes which is employed in the apparatus is not critical and can vary within a wide range. For limited purposes, a single tube could be used. Use of as many as 500 or more tubes is also feasible. In commercial operations, however, the apparatus will normally contain about 200 to 400 tubes. The tubes will normally have an outside diameter ranging between 1.5 and 3 inches, and preferably about 2 inches. The more critical factor with regard to the tube specifications is the length thereof which is heated, since for all practical purposes this is the effective length of the tube. Generally, the heated length of the tube will be about 10 to 25 feet, there being a close interdependence between the initial temperature and concentration of the feed and the heated length of the tubes.

The heated tube length, air temperature and temperature of the heat-exchange medium should be selected so that the urea which is discharged from the tubes will have a temperature of about 260 to 310° Fahrenheit and a water content of about 1.0 to 2.5 percent by weight, and preferably about 285 to 300° Fahrenheit and 1.5 percent, respectively.

The depth of the packed section should be about 5 to 35 inches, in order to reduce the water content of the urea from the tubes to the desired level, and preferably about 8 to 30 inches. For the best operating efficiency it is desirable that the area of the packed section approximate the cross sectional area occupied by the tubes. This will give the maximum in distribution, and hence, the maximum utilization of the packed section. Although Pall rings are preferred, the packed section can be packed with any contact material. The packing is supported upon horizontal foraminous means such as a grating.

As was mentioned previously, the water content of the urea product from the packed section will be less than about 1.0 percent by weight, and preferably less than about 0.5 percent. The biuret increase of the urea will normally be less than about 0.5 percent by weight thereof, and generally less than 0.3 percent. In this regard, it is important that the urea solution never be heated to too high a temperature, its exit temperature being within the range of 260 to 295° Fahrenheit. If the temperature of the product is allowed to drop below 260° Fahrenheit freezing on the surfaces of the apparatus will be encountered.

Illustrative of the efficacy of the present invention is the following example.

Example

An apparatus was constructed in accordance with the present invention and had a single tube of 15 feet heated length, with a 2-inch O.D. (12 B.W.G.), and discharging upon a 9-inch packed section containing ⅝-inch Pall rings, all in a 5-inch diameter column. The input solution contained about 20 percent water, the remainder being urea and a small amount of biuret. This solution was fed into the unit at a temperature of about 212° Fahrenheit and at a flow rate of about 1.69 pounds per minute.

Air heated to a temperature of about 285° Fahrenheit was introduced into the unit at a rate of about 0.62 pound per second per square foot of tube cross section. "Aroclor" was used as the heat-exchange fluid and was introduced into the unit at a temperature of about 310° Fahrenheit. The urea discharged from the apparatus had a temperature of about 274° Fahrenheit and was analyzed as having 0.4 percent by weight of water and a biuret increase of 0.29 percent by weight based upon the weight of urea.

As will be readily apparent from the foregoing description and example, the method and apparatus of the present invention enable rapid and effective drying of liquid compositions in a single pass and at atmospheric pressure. The apparatus is ecoonmical in construction and operation and provides uniform and trouble-free distribution of material therein, and controllable drying. The use of a falling-film evaporator section prior to a packed section in a single casing, combined with a counter-current heated gas sweep at carefully controlled temperatures, rates, and residence times, is highly effective in producing a urea product containing less than 1.0 percent, and preferably less than 0.5 percent by weight of water, from a feed stream containing about 5 to 35 percent of water, in a single pass and with a concomitant biuret increase of less than about 0.5 percent by weight.

Having thus described the invention, we claim:

1. In a process for drying urea solutions in a single pass to a water content of less than about 1.0 percent based upon the weight of the product, the steps comprising: forming on the interior surface of a multiplicity of elongated vertically disposed tubes a substantially uniform film of a urea solution containing about 5.0 to 35.0 percent by weight thereof of water; contacting a substantial portion of the exterior surface of the portion of said tubes through which the urea solution passes with a heating medium to heat the solution to a temperature of about 260 to 310° Fahrenheit and to reduce the water content thereof to about 1.0 to 2.5 percent by weight; passing all of the heated urea solution from said tubes downwardly and directly in a free fall onto and through a packed section; passing a stream of inert gas heated to a temperature of about 250 to 350° Fahrenheit upwardly through said packed section and thereafter through said tubes in counter-current contact with the urea solution in both said packed section and tubes, said inert gas having a mass velocity of about 0.3 to 0.9 pound per second per square foot of tube cross-section; and recovering from the bottom of said packed section urea at a temperature of about 260 to 295° Fahrenheit with a water content of less than about 1.0 percent by weight, the urea solution residing in the heated portion of said tubes and in said packed section for a total of less than about 35 seconds, said steps being carried out at substantially atmospheric pressure.

2. The process of claim 1 wherein the increase in the biuret content of the urea is less than about 0.5 percent based upon the weight of urea.

3. The process of claim 1 wherein the water content of said urea recovered from the bottom of said packed section is less than 0.5 percent by weight thereof, and the total residence time is less than about 20 seconds.

4. In a process for drying urea solutions in a single pass to a water content of less than about 1.0 percent based upon the weight of product, the steps comprising: forming on the interior surface of a multiplicity of elongated vertically disposed tubes a substantially uniform film of a urea solution having a temperature of about 120 to 260° Fahrenheit and containing about 5 to 35 percent by weight thereof of free water, each of said tubes having a diameter of about 1.5 to 3 inches; contacting the exterior surface of the portion of said tubes through which the urea solution passes, over a length of about 10 to 25 feet, with a heating medium to heat the urea solution to a temperature of about 260 to 310° Fahrenheit and to reduce the water content thereof to about 1.0 to 2.5 percent by weight; passing all the urea solution from said tubes downwardly and directly in a free fall onto and through a packed section of about 5 to 35 inches in depth; passing a stream of air heated to a temperature of about 250 to 350° Fahrenheit upwardly through said packed section and thereafter through said tubes in counter-current contact with the urea solution in both said packed section and said tubes, said air having a mass velocity of from about 0.3 to 0.9 pound per second per square foot of tube cross-section, and recovering from the bottom of said packed section urea at a temperature of about 260 to 295° Fahrenheit with a water content of less than about 1.0 percent by weight, the urea solution residing in the heated portion of said tubes and in said packed section for a total of less than about 35 seconds, said steps being carried out at substantially atmospheric pressure.

5. The process of claim 4 wherein the urea recovered from the bottom of said packed section has a water content of less than about 0.5 percent by weight, wherein the total residence time is less than about 20 seconds, and wherein the increase in biuret content is less than about 0.5 percent based on the weight of urea.

6. A drying apparatus for a fluid composition comprising a vertical casing; a generally horizontal upper tube sheet in said casing defining a distribution chamber thereabove; a generally horizontal lower tube sheet in said casing; a bottom wall spaced below said lower tube sheet defining a plenum chamber in the lower portion of said casing; a discharge outlet adjacent said bottom walls generally horizontal foraminous support means positioned between said lower tube sheet and bottom wall; a plurality of vertically disposed heat-exchange tubes spaced about the horizontal cross-section of said casing and supported in said tube sheets and extending therethrough; distributing means at the upper ends of said tubes for admitting controlled amounts of fluid composition from said distribution chamber to said tubes during operation to form a substantially uniform film on the inner peripheral surface thereof; packing means supported upon said support means, and providing a packed section, the upper surface of said packing means being spaced below the lower ends of said tubes which distribute the effluent therefrom directly onto and over the major portion of the upper surface of said packing means; means for supplying a heated fluid to the casing between said tube sheets for heat exchange with said tubes; an upwardly-opening generally funnel-shaped member within said plenum chamber, positioned below and around said support means and packing, said member having a generally conically-shaped section tapering downwardly to said discharge outlet adjacent said bottom wall and communicating directly therewith, said packed section being disposed within said plenum chamber and funnel-shaped member, said funnel-shaped member being of lesser diameter than said vertical casing and of greater diameter than said packed section to provide spacing therebetween; means for supplying fluid composition to said distribution chamber; means for supplying heated inert gas to said plenum chamber, the inert gas supplied to said plenum chamber passing first between said casing and funnel-shaped member and then between said funnel-shaped member and packed section, said inert gas thence passing upwardly through said packing means and tubes in counter-current contact with the fluid composition during operation thereof; and an outlet in said distribution chamber for discharging upwardly passing gas.

7. The apparatus of claim 6 wherein said upper and lower tube sheets are spaced about 10 to 25 feet apart and wherein the depth of the packing means is about 5 to 35 inches and wherein the tubes have a diameter of about 1.5 to 3 inches.

References Cited

UNITED STATES PATENTS

| | | | |
|---|---|---|---|
| 2,933,527 | 4/1960 | Guyer et al. | 260—555 |
| 3,087,533 | 4/1963 | Graumann et al. | 159—13 |
| 3,147,174 | 9/1964 | Cook | 159—47 |

NORMAN YUDKOFF, Primary Examiner

J. SOFER, Assistant Examiner

U.S. Cl. X.R.

159—49